United States Patent
Schelstraete et al.

(10) Patent No.: US 8,427,933 B2
(45) Date of Patent: Apr. 23, 2013

(54) METHOD AND APPARATUS FOR DMT CROSSTALK CANCELLATION

(75) Inventors: Sigurd Schelstraete, Menlo Park, CA (US); Sam Heidari, Los Altos Hills, CA (US)

(73) Assignee: Ikanos Communications, Inc., Fremont, CA (US)

( * ) Notice: Subject to any disclaimer, the term of this patent is extended or adjusted under 35 U.S.C. 154(b) by 889 days.

(21) Appl. No.: 12/583,694

(22) Filed: Aug. 24, 2009

(65) Prior Publication Data

US 2010/0046738 A1 Feb. 25, 2010

Related U.S. Application Data

(60) Provisional application No. 61/091,358, filed on Aug. 23, 2008, provisional application No. 61/151,441, filed on Feb. 10, 2009.

(51) Int. Cl.
  *H04J 1/12* (2006.01)
  *H04J 3/10* (2006.01)
(52) U.S. Cl.
  USPC .......................................................... 370/201
(58) Field of Classification Search .................... 370/201
  See application file for complete search history.

(56) References Cited

U.S. PATENT DOCUMENTS

| | | | |
|---|---|---|---|
| 7,400,710 | B2 | 7/2008 | Langberg et al. |
| 2002/0027985 | A1 | 3/2002 | Rashid-Farrokhi |
| 2002/0042836 | A1 | 4/2002 | Mallory |
| 2003/0206559 | A1 | 11/2003 | Trachewsky et al. |
| 2006/0259535 | A1 | 11/2006 | Cioffi et al. |
| 2007/0230548 | A1 | 10/2007 | Van De Wiel et al. |
| 2008/0198909 | A1 | 8/2008 | Tsatsanis et al. |
| 2009/0059780 | A1 | 3/2009 | De Lind Van Wijngaarden et al. |
| 2009/0116582 | A1* | 5/2009 | Ashikhmin et al. .......... 375/296 |

* cited by examiner

*Primary Examiner* — Alexander Jamal
(74) *Attorney, Agent, or Firm* — Mark J. Danielson; Pillsbury Winthrop Shaw Pittman LLP

(57) ABSTRACT

An apparatus for precoding multi-tone modulated transmissions of a plurality of communication channels over bundled subscriber lines. The apparatus includes a pseudo symbol controller and a precoder. The pseudo symbol controller detects a victim communication channel and an interferer communication channel having non-matching symbol rates, and transforms the interferor channel into a pseudo-symbol having both a substantially similar length as a corresponding symbol of the victim channel together with defined tonal characteristics expressed in terms of the interferor channel. The precoder assigns crosstalk coefficients to selected sub-channels or tones of the pseudo symbol and precodes the victim channel with the pseudo symbol using the crosstalk coefficients; thereby generating a precoded victim symbol which exhibits reduced crosstalk between the selected victim and interferor.

19 Claims, 6 Drawing Sheets

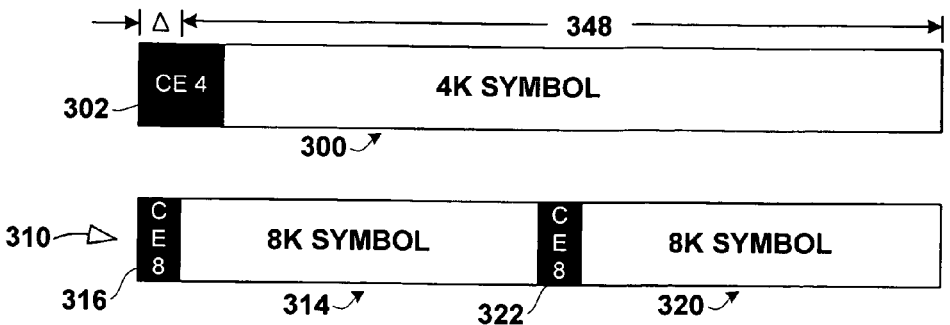
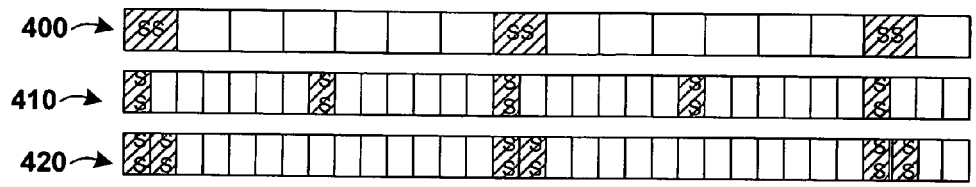
FIG. 3
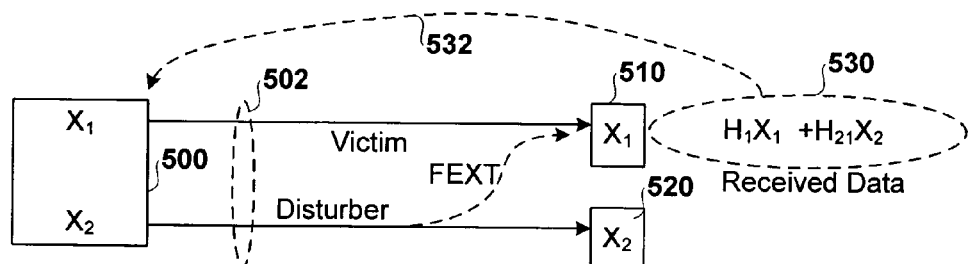
FIG. 4
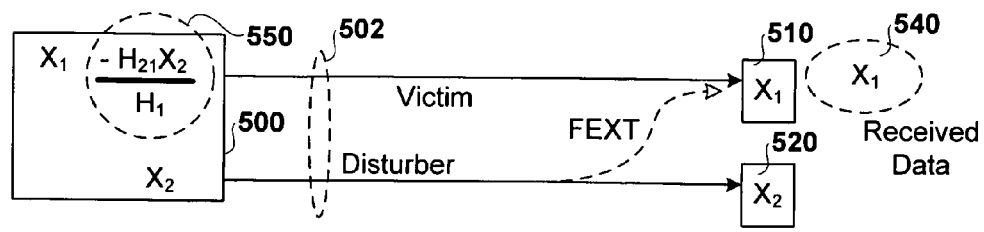
FIG. 5A
FIG. 5B
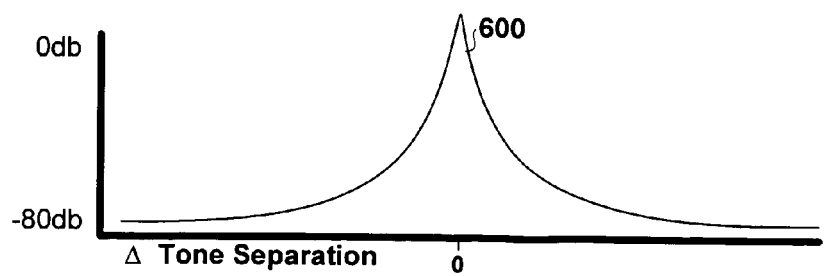
FIG. 6

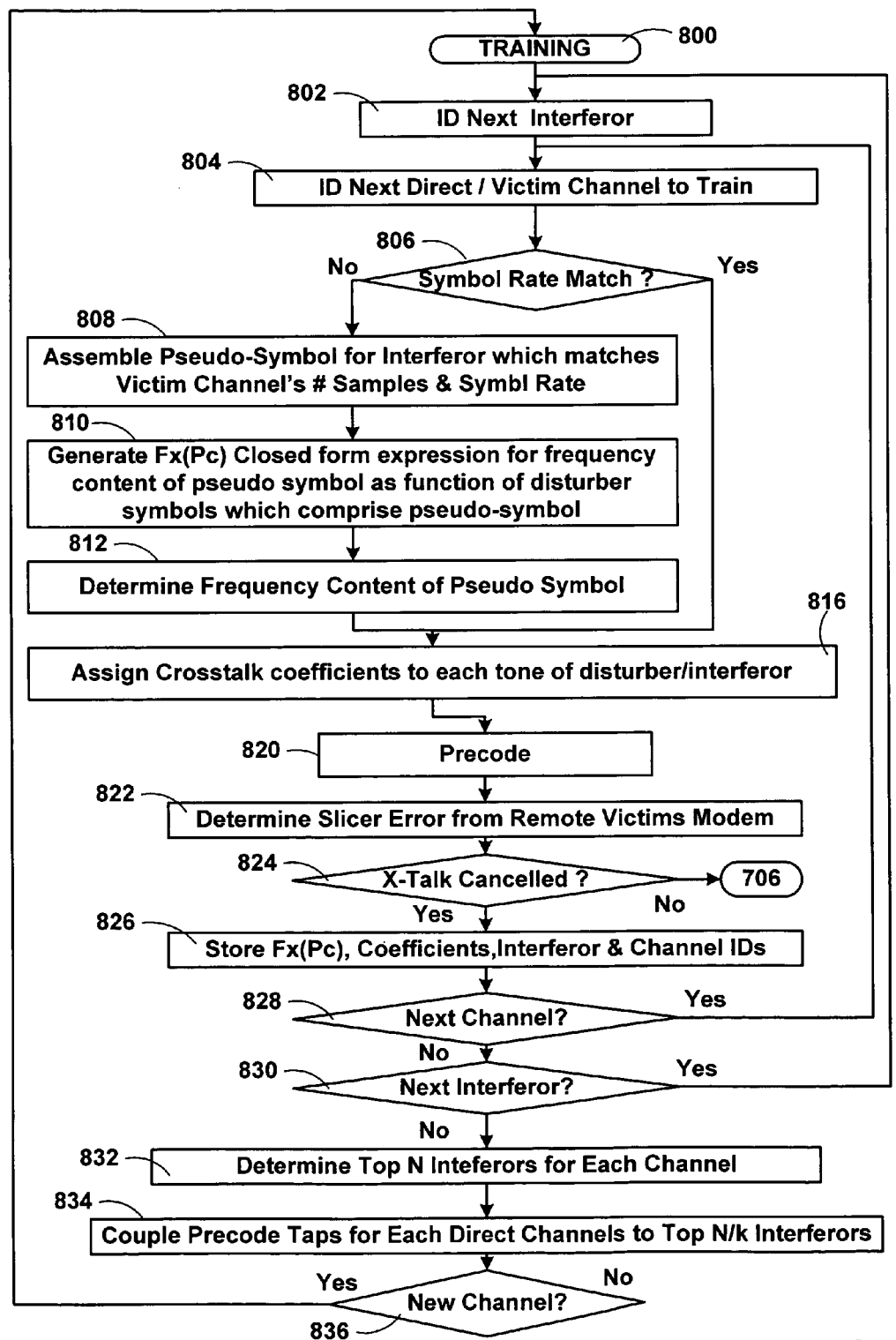
FIG. 8A  TRAINING

SHOWTIME

METHOD AND APPARATUS FOR DMT CROSSTALK CANCELLATION

CROSS REFERENCE TO RELATED APPLICATION

This application claims the benefit of prior filed co-pending Provisional Applications: No. 61/091,358 filed on Aug. 23, 2008 entitled "Frequency Domain Crosstalk Canceling with Different Symbol Rates" and No. 61/151,441 filed on Feb. 10, 2009 entitled "Frequency Domain Crosstalk Canceling with Different Symbol Rates" which are incorporated herein by reference in their entirety as if fully set forth herein.

BACKGROUND OF THE INVENTION

1. Field of Invention

The field of the present invention relates to multi-tone transceivers.

2. Description of the Related Art

Digital Subscriber Lines (DSL) technology and improvements thereon including: G.Lite, ADSL, VDSL, HDSL all of which are broadly identified as X-DSL have been developed to increase the effective bandwidth of existing subscriber line connections, without requiring the installation of new fiber optic cable. An X-DSL modem operates at frequencies higher than the voice band frequencies, thus an X-DSL modem may operate simultaneously with a voice band modem or a telephone conversation. Currently there are over ten discrete X-DSL standards, including: G.Lite, ADSL, VDSL, SDSL, MDSL, RADSL, HDSL, etc. Each standard is typically implemented with a multi-tone (DMT) line code, or modulation protocol.

The primary factor limiting the bandwidth or channel capacity of any of the above discussed X-DSL protocols is noise, whether that noise be from echo, channel cross talk, impulse or background sources. Efforts are made throughout the DSL architecture to minimize noise.

For voice applications a certain amount of echo was considered a positive feedback for telephone conversations until the longer delays introduced by satellite links permeated the system. For a DSL system echo effects signal integrity and introduces unacceptable errors in data transmissions. An echo canceller synthesizers the echo path including the digital analog converter, the transmit filter, the hybrid circuit, the receiver filter, in the analog-to-digital converter. An echo canceller can produce an echo replica with the same transmitting data but with reverse signed to cancel the real echo on the receive path.

The topology of subscriber lines themselves may be used to minimize cross-talk between subscriber lines. Typically, telephone subscriber loops are organized in a binder with 10, 25, or 50 pairs each sharing a common physical or electrical shield in a cable. Due to capacitance and inductive coupling there's cross-talk between each twisted pair even though the pairs are well insulated for DC. The effective cross-talk is reduced by adapting different twist distances among different pairs in the binder group. Binder groups are also twisted such that no two groups are adjacent for long runs.

The hybrid circuit which couples the modem to the subscriber line is also designed with noise reduction in mind. The hybrid is basically a bridge circuit which allows bi-directional communication on the subscriber line. When the bridge is balanced the spillover of noise from the modem's transmitted signal to the received signal is reduced. Balancing however requires an impedance match with the telephone subscriber loop which is never fully satisfied because the input impedance of the telephone loop varies from one loop to the next due to taps and temperature variations in the individual subscriber lines.

Cross-talk noise comes from a adjacent telephone subscriber loops of the same or different types of transmission systems. Cross-talk is divided into what is known as near end cross talk (NEXT) and far end cross-talk (FEXT) depending on where the cross-talk is generated. NEXT is defined as cross-talk between subscriber lines in a binder coupled on one end with a common transceiver. FEXT is defined as a cross-talk affect between a receiving path and a transmitting path of the DSL transceivers on opposite ends of two different subscriber loops within the same twisted pair cable or binder. The FEXT noise at the receiver front end of a particular DSL transceiver is caused by signals transmitted by other transceivers at the opposite end of the twisted cable.

What is needed is modem with improved capabilities for crosstalk cancellation.

SUMMARY OF THE INVENTION

An apparatus for preceding multi-tone modulated transmissions of a plurality of communication channels over bundled subscriber lines. The apparatus includes a pseudo symbol controller and a precoder. The pseudo symbol controller detects a victim communication channel and an interferer communication channel having non-matching symbol rates, and transforms the interferer channel into a pseudo-symbol having both a substantially similar length as a corresponding symbol of the victim channel together with defined tonal characteristics expressed in terms of the interferer channel. The precoder assigns crosstalk coefficients to selected sub-channels or tones of the pseudo symbol and precodes the victim channel with the pseudo symbol using the crosstalk coefficients; thereby generating a precoded victim symbol which exhibits reduced crosstalk between the selected victim and interferor.

Associated means and methods are also disclosed.

BRIEF DESCRIPTION OF THE DRAWINGS

These and other features and advantages of the present invention will become more apparent to those skilled in the art from the following detailed description in conjunction with the appended drawings in which:

FIG. 3 is a detailed data structure view in the frequency domain of two communication channels with dissimilar symbol rates;

FIG. 4 is a data structure view in the frequency domain of two communication channels shown in FIG. 3 including synchronization symbol portions thereof;

FIGS. 5A-5B are simplified transmission diagrams showing training and showtime phases respectively of precoding operation;

FIG. 6 is a graph showing the crosstalk weighting assigned to a tone in the pseudo channel expressed in terms of its separation in frequency from a contributing tone in the disturber channel;

FIGS. 8A-8B are process flow diagrams for precoding during both training and showtime phases of operation respectively.

DETAILED DESCRIPTION OF THE EMBODIMENTS

An apparatus and method for reducing interference over a common communication medium, wired or wireless is provided. The apparatus reduces interference from a number of sources using a common architecture which may be used to service a modem pool or discrete modems which share the common communication medium. Interference due to far end cross-talk (FEXT) may all be substantially reduced or cancelled by the apparatus. Additionally, channel characteristics for individual data channels across the common communication medium may be determined. The apparatus provides support for multiple modem protocols including X-DSL protocols such as G.Lite, ADSL, VDSL, SDSL, MDSL, RADSL, and HDSL. The apparatus supports discrete multi-tone (DMT) line codes associated with X-DSL communications. The apparatus may be implemented in hardware, firmware or software.

Figure 1:
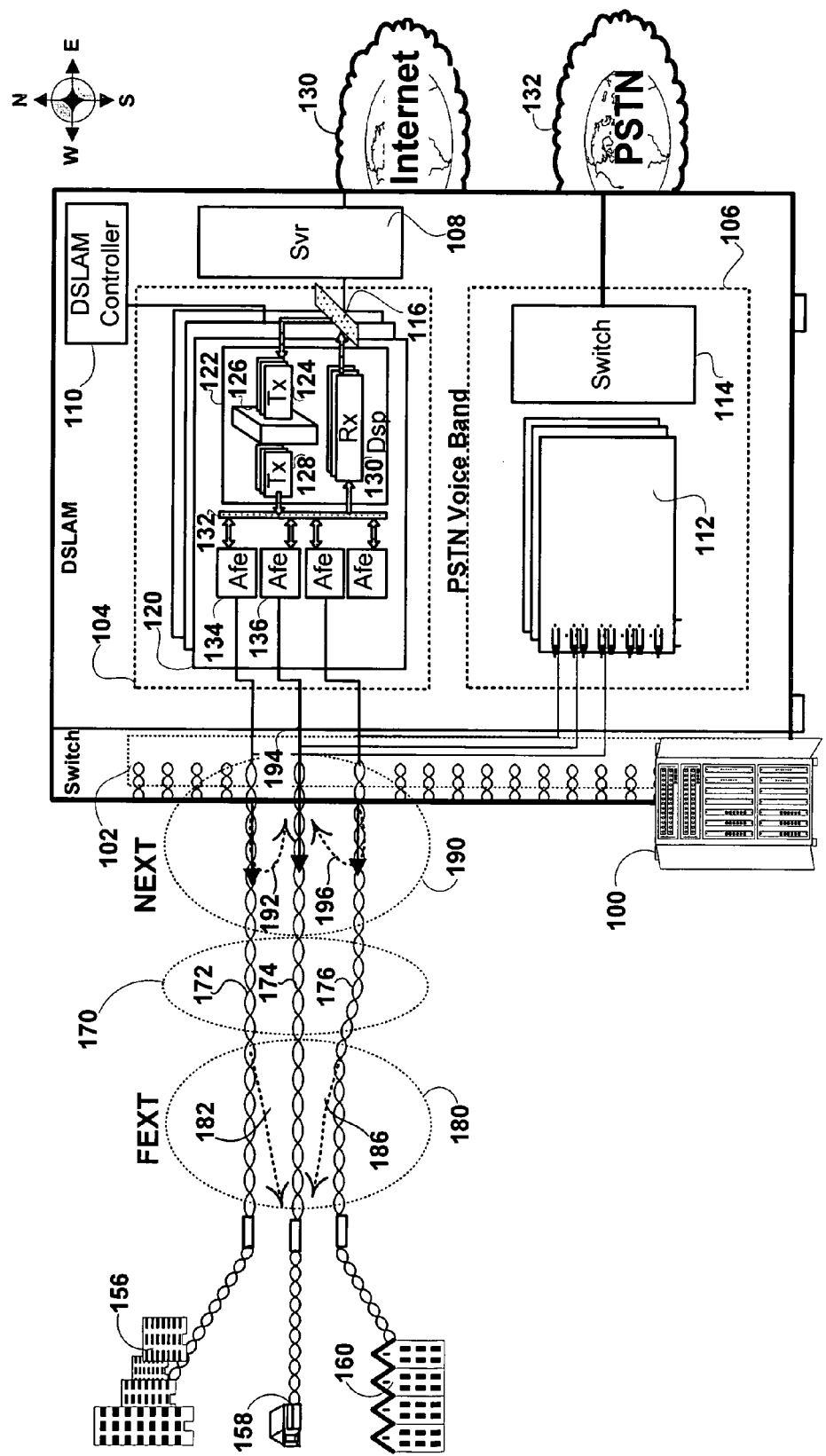
FIG. 1 shows a communication system with a pair of multi-mode multi-channel modem line cards coupled to one another by a binder of subscriber lines between a public switched telephone network (PSTN) central office (CO) and remote sites.

FIG. 1 shows a communication system with a pair of multi-mode multi-channel modem line cards coupled to one another by a binder of subscriber lines between a public switched telephone network (PSTN) central office (CO) and a remote site. The system includes a CO 100 and a remote transceivers 156, 158, 160. The CO and remote line card are coupled to one another via a subscriber line binder 170 which includes individual subscriber lines 172, 174, 176.

Each of the subscriber line connections terminates on the CO end, in the frame room 102 of the CO. From this room connections are made for each subscriber line via splitters and hybrids to both a DSLAM 104 and to the voice band racks 106. The splitter shunts voice band communications to dedicated line cards, e.g. line card 112 or to a voice band modem pool (not shown). The splitter shunts higher frequency X-DSL communications on the subscriber line to a selected line card, e.g. line card 120, within DSLAM 104. The line cards of the current invention are universal, meaning they can handle any current or evolving standard of X-DSL and may be upgraded on the fly to handle new standards.

Voice band call set up is controlled by a Telco switch matrix 114 such as SS7. This makes point-to-point connections to other subscribers for voice band communications across the public switched telephone network 132. The X-DSL communications may be processed by a universal line card such as line card 120. That line card includes a plurality of AFE's 134-136 each capable of supporting a plurality of subscriber lines. The AFEs are coupled via a packet based bus 132 to the DSP 122. For downstream communications from the CO to the remote site, the DSP modulates the data for each communication channel, the AFE transforms the digital symbol packets assembled by the DSP and converts them to an analog signal which is output on the subscriber line associated with the respective channel. For upstream communications from the remote site to the CO the AFE each received channel is converted to a digitized data sample which is sent to the DSP. The DSP is capable of multi-protocol support for all subscriber lines to which the AFE's are coupled. Communications between AFE's, and DSP(s) may be packet based. The line card 120 is coupled to a back-plane bus 116 which may be capable of offloading and transporting low latency X-DSL traffic between other DSPs for load balancing. The backplane bus of the DSLAM also couples each line card to the Internet 130 via server 108. Each of the DSLAM line cards operates under the control of a DSLAM controller 110 which handles global provisioning, e.g. allocation of subscriber lines to AFE and DSP resources. The various components on the line card form a plurality of logical modems each handling upstream and downstream communications across corresponding subscriber lines. When an X-DSL communication is established on a subscriber line, a specific channel identifier is allocated to that communication. That identifier is used in the above mentioned packet based embodiment to track each packet as it moves in an upstream or downstream direction between the AFE and DSP.

In an alternate embodiment of the invention the termination at the remote site would be a single logical modem.

The DSP 122 is shown with transmit path components 124, 126, 128, and receive path components 130. The precoder 126 operates during a training phase to establish coefficients for canceling Far end cross talk (FEXT). FEXT occurs as a result of transmissions to the remotes on subscriber lines 172 and 176 leaking into transmissions 194 from the CO on subscriber line 174 This leakage is represented by arrows 182,186 from subscriber lines 172, 176 respectively into the channel 194 received at modem 158. Near end cross-talk (NEXT) results from transmissions from the CO leaking over into reception at that same location. This leakage is represented by arrows 192,196 from subscriber lines 172, 176 respectively into the channel 194 received at the CO on subscriber line 174. Self-NEXT, a.k.a. echo, occurs on every subscriber line including line 174.

Figure 2:
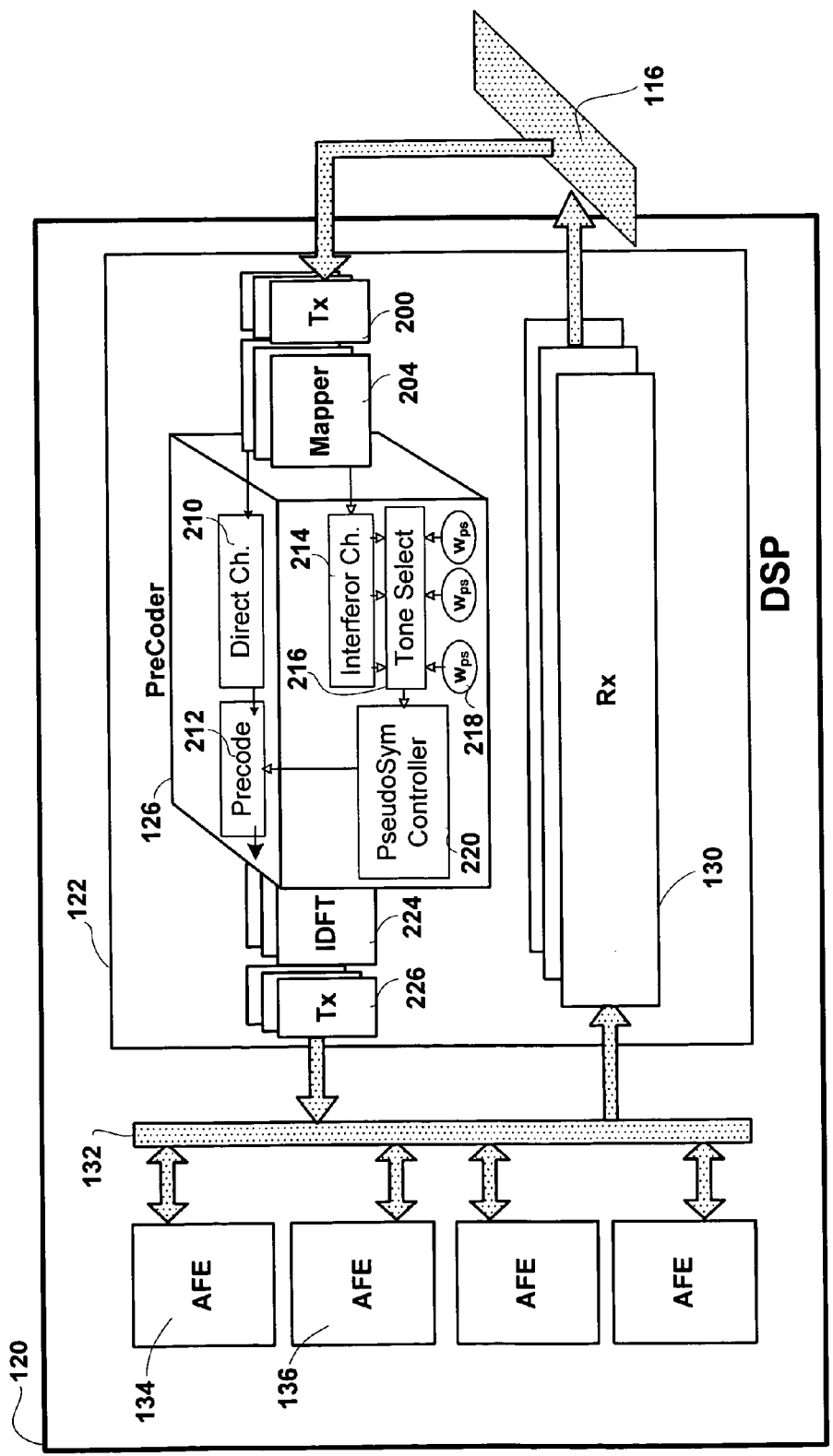
FIG. 2 is a detailed hardware block diagram of a precoder portion of one of the modem line cards shown in FIG. 1.

FIG. 2 is a detailed hardware block diagram of a precoder portion of one of the modem line cards shown in FIG. 1. The transmit path components include framers and tone orderer 200, mapper 204, precoder 126, Inverse Discrete Fourier Transform components 224 and remaining transmit path components 226.

The precoder 126 modifies the transmit signal of a line to pre-compensate for the expected crosstalk from the other lines. For every line for which crosstalk should be canceled, the precoder modifies the modulation symbol (i.e. mapper output) on each of the tones by subtracting a linear combination of the modulation symbols (on the corresponding tone) of the disturbing lines. The factors in the linear combination are typically the crosstalk channel from the disturbing line divided by the direct channel of the victim line. In this invention, the precoder shows a number of additional blocks.

The pseudo-symbol controller 220 handles pseudo symbol detection, aggregation from the disturber channel and calculations related thereto including generation of the frequency content of the pseudo-symbol. The pseudo-symbol is a hypothetical symbol on the disturber line that has the same length as a symbol on the victim line. In the time domain it is obtained by considering a number of samples on the disturber line that coincides with the number of samples that are comprised in a symbol on the victim line. In the frequency domain, the pseudo-symbol can be expressed as a combination of the frequency contents of the disturber symbols whose samples contribute to a particular pseudo-symbol. The Tone selector 216 assembles the frequency contents of the relevant disturber symbols and output a tone-by-tone value for the pseudo-symbol. Typically, multiple tones of the disturber symbol will contribute to a single tome of the pseudo-symbol. The number of tones that contribute could be truncated to limit complexity. In that case, the tone-selector 216 would determine which tones from the disturber/interferor symbols 214 to consider for a given tone of the pseudo symbol.

The weighting of the various disturber tones that contrite to a tone of the pseudo-symbol is determined by a configurable function 218. This function can be calculated (off-line) for a given alignment of disturber and victim symbols. The output of the pseudo-symbol controller is sent to the precoder 212. The precoder takes as input the crosstalk channel coefficients and the various direct channels 210 of the lines connected to the precoder.

FIGS. 5A-5B are simplified transmission diagrams showing training and showtime phases respectively of precoding operation. Transmitter 500 is shown transmitting data across two bundled subscriber lines 502 to remote receivers, e.g. receivers 510 and 520. During the training phase of operation shown in FIG. 5A, the crosstalk from the disturber line 2 affects the noise level at the receiver end 510 of victim line 1. The resultant received signal 530 is passed back 532 to the transmitter during training to evaluate the crosstalk channel. The crosstalk is represented by a term H21*X2 in 530, where H21 is the crosstalk channel from lin2 into line 1 (i.e. the coupling from the transmitter 500 of line 2 to the receiver 510 of line 1). H1 is the "direct/victim channel", i.e. the coupling from the transmitter of line 1 to the intended receiver 510 on line 1. The training allows the modems to estimate the value of H21. FIG. 5B illustrates the concept of pre-coding, or pre-compensating the crosstalk. In order to pre-compensate, a term –H21/H1*X2, reference 550, is added to the transmission on line 1. At the traversing the direct channel to the receiver of line 1, this term will have changed to become –H1*(H21/H1*X2)=–H21*X2. As such, it has the same value as the expected crosstalk from line 2, only with opposite sign. Therefore, the added term will cancel the physical crosstalk from line 2 into line 1 as exhibited in the resultant received signal 540, which exhibits no crosstalk.

Cancelling a 8 k Disturber's Effect on a 4 k Victim:

Crosstalk canceling in DSL is generally conceived as a frequency domain process. It can be accomplished for bundled subscriber lines coupled on one end to a modem pool, and to discrete modems on the opposing end, a.k.a. vectoring, or on a bundle of subscriber lines coupled at both opposing ends to associated modem pools, a.k.a. multiple-input multiple output (MIMO). By synchronizing symbols on different lines, crosstalk canceling can be performed using a single tap per tone (and per crosstalker). When the system consists of a mixed deployment of VDSL2 systems operating at 4 kHz and 8 kHz symbols rates, it is no longer possible to align the systems and achieve the required orthogonality. As a result, crosstalk can no longer be canceled per tone. In the following embodiment of the invention a frequency-domain approach to canceling crosstalk from a system with 8 kHz symbol rate into a system with a 4 kHz symbol rate is disclosed.

For crosstalk channel estimation, content and location of the sync symbols (which are used to obtain the crosstalk channels) is modified such that 4 kHz and 8 kHz lines share a common sync symbol, even though the data rates on the lines are different. This involves doubling the length of the sync symbol on the 8 kHz line and limiting the frequency-content of the sync symbol to even tones only on the 4 kHz line.

For crosstalk canceling, the even tones can be dealt with using a single operation per tone, while the odd tones require information from multiple tones to be combined. Various levels of implementation complexity can be considered by limiting the number of odd tones that is considered during the canceling process. The slicing process of sync symbols can operate in much the same way as is done for lines with equal rates. The canceling process will be handled externally by a dedicated chip.

Crosstalk canceling in DSL facilitated by the fact that canceling can be performed as a single operation per tone (and per crosstalker) when DMT symbols across different lines are aligned and synchronized to a common clock. A similar operation in the time domain would require significantly more operations. In general, the basic requirements to enable simple frequency domain cancellation are:

symbols across different lines need to be synchronized all symbols need to be the same length sync symbols on different lines need to be synchronized to allow for easy estimation of the crosstalk channel VDSL2 has defined a number of different profiles. While most profiles specify a 4 kHz symbol rate, profile 30a has a symbol rate equal to 8 kHz. This makes it fundamentally impossible to comply with the basic requirements outlined above. As deployments go, it is not always possible to assume that only profiles with 4 kHz tone spacing (resp. 8 kHz tone spacing) will be present. The VDSL2 system may switch profiles as a function of loop length and other factors. As such, a mixed deployment containing both systems at 4 Hz symbol rate and systems at 8 kHz symbol rate can occur in practice.

Crosstalk canceling between systems with different symbol rates (specifically 4 kHz and 8 kHz symbol rates is disclosed, with a particular example being 8 kHz interferors and 4 kHz victim/direct channels.

Crosstalk channel estimation relies on the data gathered from sync symbols. All sync symbols in a vectored system are aligned and the sign is modulated with an orthogonal sequence. When this is done, information about the crosstalk channels can be derived from the slicer errors of consecutive sync symbols. This information can be recovered by appropriate processing. Synchronization of sync symbols can currently not be achieved when systems with different symbol rates are considered. VDSL2 systems insert a sync symbol after each 256 data symbols. The sync symbols of systems operating at 4 kHz and 8 kHz symbol rates will not coincide as illustrated in FIG. 4, specifically 4 kHz channel 400 and 8 kHz channel 410. While there are other ways of performing crosstalk channel estimation, the method that relies on synchronized sync symbols and orthogonal sequences is by far the most convenient. This method can still be used provided that we make some modifications to the content and the location of the sync symbols on the 8 kHz lines. Specifically as shown in modified 8 kHz symbol stream 420 in FIG. 4, instead of sending a sync symbol every 256 data symbols, those lines will send two back-to-back sync symbols every 512 symbols. In addition, the second symbol in each pair of back-to-back symbols is phase rotated to assure a smooth transition between the two sync symbols. As a result, the two contiguous sync symbols look exactly the same as a sync symbol sent on the 4 kHz line, with the only difference that only the even tones, on a 4 kHz tone grid, contain power. Also, with this embodiment of the invention, the number of sync symbols and therefore the total overhead associated with sync symbols remains the same. When the symbols are aligned this way, sync symbols of a 4 kHz line are orthogonal to the sync symbols of an 8 kHz line and vice versa. In this embodiment of the invention the slicer errors on a give tone are only affected by the signal sent on that tone on other lines. The same method can be maintained for estimating crosstalk channels. Note that this will only produce the crosstalk channel values at multiples of 8 kHz. However, the value of the crosstalk channel on the intermediate tones can be estimated through interpolation.

Impact of 8 kHz Symbols on 4 kHz Symbols

Although the symbols of a 4 kHz system and an 8 kHz systems cannot be aligned exactly, we'll assume that the 8 kHz symbols and 4 kHz symbols are aligned such that each 4 kHz symbol coincides with exactly two 8 kHz symbols. This is illustrated in FIG. 3 where the 4 kHz symbol 300 with a cyclic prefix 302 and 8 k symbols 314 and 320 with cyclic prefixes 316 and 322 respectively are shown. With this alignment, two and only two 8 kHz symbols 310 will contribute to the crosstalk experienced by the 4 kHz symbol. The first step is to calculate the crosstalk in terms of the frequency-domain content of those two 8 kHz symbols. In FIG. 3, the following notation is used:

CE4 is the cyclic extension of the 4 kHz symbol

CE8 is the cyclic extension of the 8 kHz symbol. This value is exactly half of CE4, otherwise synchronization would not be possible.

The receiver will determine where to align the FFT window and which 2N samples to send to the FFT input. In FIG. 3, we have indicated the FFT alignment 348 with an offset delta relative to the start of the symbol (counting from the first sample of the cyclic extension). While this alignment typically is a receiver-proprietary decision, the most advantageous choice for purposes of crosstalk canceling is delta=CE8. For this value, each of the two 8 kHz symbols contributes exactly N samples to the FFT input, as illustrated in FIG. 3 pseudo-symbol 328. For the remainder of the calculations, we'll assume that this alignment is used.

Note that although each 8 kHz symbol in FIG. 3 contributes exactly N samples, the N samples from the second symbol start at the first sample of the cyclic prefix. These samples are not protected by the cyclic extension and may be subject to inter-symbol interference. This will limit the amount of cancelation that can be achieved in practice. Nevertheless, the resulting gains in SNR are still significant however. Note also, that if the 8 kHz system uses a larger spectrum than the 4 kHz system, the design of the 4 kHz system should be done such that aliasing of these higher frequencies does not affect the spectrum used by the 4 kHz system. Starting from the alignment shown in FIG. 3, we can calculate how the two 8 kHz symbols appear at the output of the 2N-point FFT.

We will denote the samples of the two 8 kHz symbols as $y_n$ and $z_n$ respectively, such that:

$$y_n = \sum_{k=0}^{N-1} Y_k e^{j\frac{2\pi k n}{N}} \quad (1)$$

$$z_n = \sum_{k=0}^{N-1} Z_k e^{j\frac{2\pi k n}{N}}$$

The samples that go into the 2N-point FFT are given by:

$$FFT_{2N}[y_0 \ldots y_{N-CE8} \ldots z_{N-1} z_0 \ldots z_{N-CE8-1}] \quad (2)$$

This is equal to:

$$FFT_{2N}\left[y_0 \ldots y_{N-1} \overbrace{0 \ldots 0}^{N}\right] + \quad (3)$$

$$FFT_{2N}\left[\overbrace{0 \ldots 0}^{N} z_{N-CE8} \ldots z_{N-1} z_0 \ldots z_{N-CE8-1}\right]$$

The first term in (3) can be calculated as:

$$\tilde{Y}_k = FFT_{2N}\left[y_0 \ldots y_{N-1} \overbrace{0 \ldots 0}^{N}\right] \quad (4)$$

$$= \sum_{n=0}^{N-1}\left(\sum_{k'=0}^{N-1} Y_{k'} \cdot e^{j\frac{2\pi k' n}{N}}\right) e^{-j\frac{2\pi k n}{N}}$$

$$= \frac{1}{N}\sum_{k'=0}^{N-1} Y_{k'} \frac{1-(-1)^{2k'-k}}{1-e^{j\frac{\pi(2k'-k)}{N}}}$$

Likewise, the second term in (3) can be calculated as:

$$\tilde{Z}_k = FFT_{2N}\left[\overbrace{0 \ldots 0}^{N} z_{N-CE8} \ldots z_{N-1} z_0 \ldots z_{N-CE8-1}\right] \quad (5)$$

$$= \sum_{n=N}^{2N-1}\left(\sum_{k'=0}^{N-1} Z_{k'} e^{j\frac{2\pi k'(n-CE8)}{N}}\right) e^{-j\frac{2\pi k n}{2N}}$$

$$= -\frac{1}{N} e^{-j\frac{\pi \cdot CE8 \cdot k}{N}} \sum_{k'=0}^{N-1} Z_{k'} \frac{1-(-1)^{2k'-k}}{1-e^{j\frac{\pi(2k'-k)}{N}}} \cdot e^{-j\frac{\pi(2k'-k)CE8}{N}}$$

From (4) and (5), we note that there is a crucial difference between the way even tones and odd tones of the 4 kHz symbol are affected by the two 8 kHz symbols. For even tones, the contribution of the two 8 kHz symbols reduces to:

$$X_{2l} = \tilde{Y}_{2l} + \tilde{Z}_{2l} \quad (6)$$

$$= Y_l + e^{-j\frac{\pi \cdot CE8 \cdot 2l}{N}} Z_l$$

In other words: the even tones are only affected by a single tone of the 8 kHz symbols and the impact is a linear combination of the constellation points modulated on that tone during each of the two 8 kHz symbols. This makes the cancellation of the crosstalk on the even tones only twice as complex as the cancellation of the crosstalk from a 4 kHz symbol. Instead of a single tap canceller, a two-tap canceller is needed for each of the even tones.

For odd tones, the situation is more complex. The contribution of the two 8 kHz symbols becomes:

$$X_{2l+1} = \tilde{Y}_{2l+1} + \tilde{Z}_{2l+1} \quad (7)$$

$$= \frac{1}{N}\sum_{k'=0}^{N-1} Y_{k'} \frac{2}{1-e^{j\frac{\pi(2(k'-l)-1)}{N}}} -$$

$$\frac{1}{N} e^{-j\frac{\pi \cdot CE8 \cdot (2l+1)}{N}}$$

$$\sum_{k'=0}^{N-1} Z_{k'} \frac{2}{1-e^{j\frac{\pi(2(k'-l)-1)}{N}}} \cdot e^{-j\frac{\pi(2(k'-l)-1)}{N}}$$

Potentially, all tones of the 8 kHz symbols will contribute to a single odd tone of the 4 kHz symbol. This makes full cancellation of the crosstalk on the even tones extremely complex.

Note however that not all 8 kHz tones in (7) contribute equally to the final output $X_{2l+1}$. In fact, the weighting function peaks sharply around k'=1, as illustrated in FIG. 6. This means that the crosstalk on the even tones can still be cancelled partially by only considering a limited number of terms in the sums in (5). For a low number of terms the complexity will still be relatively low. The higher the number of terms, the higher the complexity, but the higher the gain that can be achieved.

Canceling of 8 kHz Crosstalk into 4 kHz

Crosstalk cancelling of the 8 kHz signal into a 4 kHz symbol can be achieved by precoding, similarly to what is done in the case when all symbols have the same symbol rate. If the symbol modulated on tone k of the 4 kHz symbol is denoted as $A_k$, the precoding is achieved by adding the following terms to $A_k$:

$$A_{2k} \rightarrow A_{2k} - \frac{H_{mn}(2k)}{H_{mm}(2k)} \left( Y_k + e^{-j\frac{\pi \cdot CE8 \cdot 2k}{N}} Z_k \right) \quad (8)$$

$$A_{2k+1} \rightarrow A_{2k+1} -$$

$$\frac{H_{mn}(2k+1)}{H_{mm}(2k+1)} \frac{1}{N} \sum_{k'=0}^{N-1} \left( \begin{array}{c} Y_{k'} - e^{-j\frac{\pi \cdot CE8 \cdot (2k+1)}{N}} Z_{k'} \cdot \\ e^{-j\frac{\pi(2(k'-k)-1)CE8}{N}} \end{array} \right) \frac{2}{1 - e^{j\frac{\pi(2(k'-k)-1)}{N}}}$$

In (8), $H_{mm}$ denotes the transfer function of the direct channel, while $H_{mn}$ denotes the crosstalk transfer function between line "n" and "m". The 4 kHz system is deployed on line "m", while the 8 kHz system is deployed on line "n". For the odd tones, the number of terms in the precoding can be limited to achieve either the desired level of crosstalk canceling or the desired complexity.

Simulation

A simulation follows that implements the crosstalk canceling of an 8 kHz system into a 4 kHz system using the methodology outlined above. Both systems were connected to 200 meter loops of gauge 26 awg. To model the impulse response of the crosstalk channel, we took the 99% worst-case coupling and further assumed that the phase behavior of the crosstalk channel was identical to the phase behavior of the direct channel. In other words, the transfer function of the crosstalk channel in the frequency domain was given by:

$$H_{Xtalk}(f) = K \cdot f \cdot \sqrt{L} \cdot H(f), \quad (9)$$

Where:
K=1.5940.10$^{-10}$
L is the loop length (200 meters)
H(f) is the transfer function of the direct channel For the purposes of this analysis, tones 100 to 2000 (on the 4 kHz tone grid) were loaded with random 4 QAM symbols. The crosstalk from the 8 kHz systems occurs on the same tones. During the simulation, DMT symbols were generated for both a 4 kHz symbol rate and an 8 kHz symbol rate. The samples corresponding to the 4 kHz symbol are sent through the direct channel by performing convolution with the impulse response of the direct channel. The samples corresponding to the 8 kHz symbol are sent through the crosstalk channel by performing convolution with the impulse response of the crosstalk channel. The resulting output samples are added to make up the total receive signal consisting of useful signal and crosstalk. The receiver performs the symbol alignment as shown in FIG. 3 and calculates the SNR. The same is done for a 4 kHz system with precoding as described in formula (8). The SNR for the precoded case is calculated and compared to the SNR without precoding.

Results for Even Tones

Figure 7A:
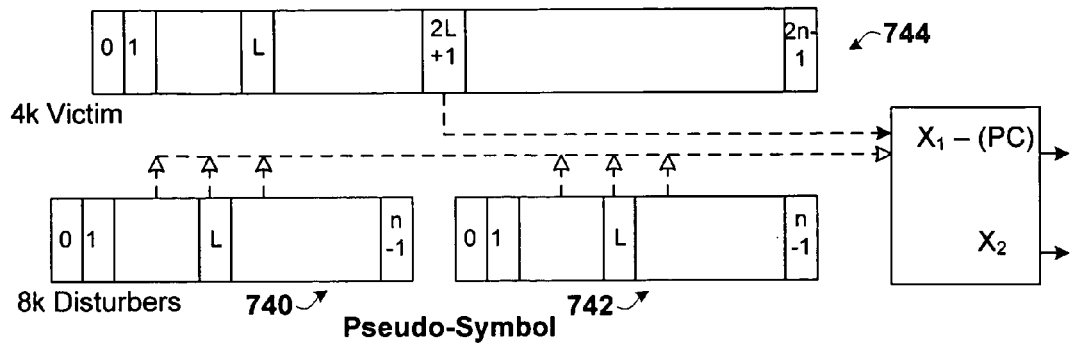
FIGS. 7A-7C are data structure diagrams showing various combinations of victim and disturber channel symbol rates and the combination of disturber channel symbols into corresponding pseudo-symbols.
Figure 7B:
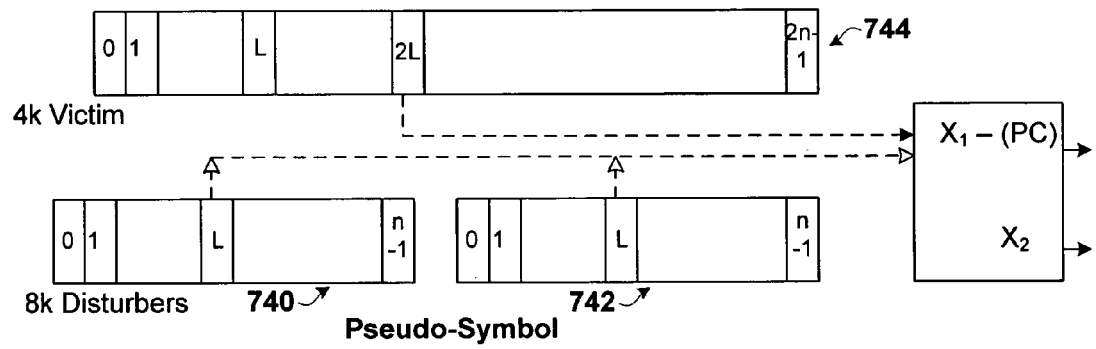

FIG. 7A-7B show pseudo-symbols for even and odd tones respectively of a 8 kHz disturber and a 4 k victim/direct channel. The interferor symbols 740 and 742 which comprise the 8 kHz pseudo symbol are shown along with the symbol 744 for the victim/direct 4 kHz channel. For even tones, the precoding can be done with a two-tap precoder per tone. As shown in (8), the crosstalk compensation that is added to an even-numbered tone at the transmitter is a linear combination of the constellation points that are modulated on that frequency during each of the two 8 kHz symbols. The SNR with and without crosstalk canceling is shown in The SNR improves significantly after crosstalk canceling. The typical improvement is between 30 and 40 dB for all of the tones. This is achieved at a computational complexity that is about double the complexity that is required for canceling crosstalk from a 4 kHz system.

Results for Odd Tones

For odd-numbered tones, the precoding becomes more complex. Theoretically, each odd-numbered tone is affected to some extent by all of the 8 kHz tones. The SNR improvement that can be achieved will depend on the complexity on is willing to tolerate. Note that in the limit, one may even decide to only cancel the crosstalk on the even-numbered tones and not attempt any improvement on the odd tones.

The gain depends to a large extent on the number of terms that is included in the precoding. shows the SNR average improvement over the tones for the different truncations. Even for as low as three tones, an improvement of more than 8 dB can be achieved. As more terms are included, the performance gain goes up slowly. The full gain of about 40 dB is only achieved when all terms are taken into account.

The following techniques can help in maintaining a feasible level complexity for crosstalk canceling:
- synchronize the symbols of the different lines such that each 4 kHz symbol overlaps with exactly two 8 kHz symbols
- modify the location of the sync symbols on the 8 kHz line to coincide with the sync symbols of the 4 kHz line. Also modify the symbols on the 8 kHz line so that they appear identical on both lines.
- Canceling of the crosstalk from an 8 kHz symbol into the even-numbered tones of a 4 kHz symbol requires a two-tap operation that represents roughly twice the complexity that would be required for the crosstalk cancelation of a 4 kHz system.
- Canceling of the crosstalk from an 8 kHz symbol into the odd-numbered tones of a 4 kHz symbol potentially requires a linear combination of the constellation points sent on all loaded tones of the 8 kHz symbols. Because of the nature of the weighting function, the number of terms can be limited while still achieving moderately good SNR improvements.

Figure 7C:
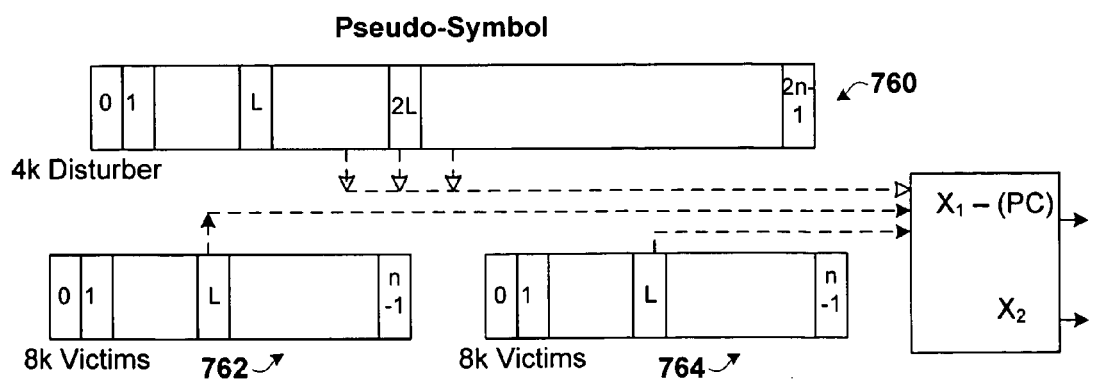

Cancelling a 4 k Disturbers Effect on an 8 k Victim:

The 4 kHz symbols and 8 kHz symbols are aligned such that each 4 kHz symbol overlaps with exactly two 8 kHz symbols. The same assumption will be made in this contribution. The alignment of symbols is illustrated in FIG. 3 and further in FIG. 7C where the 4 kHz disturber/interferor pseudo-symbol 760 and the pair of 8 kHz victims 762 and 764 are shown. Again, the value "N" denotes the number of tones in the 4 kHz symbol. For the reverse case of 8 kHz crosstalk into a 4 kHz symbol discussed in above, we assumed a specific alignment of the FFT window at the 4 kHz receiver relative to the position of the 8 kHz symbols. The FFT window was offset by CE8 samples relative to the start of the 4 kHz symbol. This was done to ensure that the 8 kHz symbols affecting the 4 kHz symbol each contributed exactly N samples to the 2N input samples of the (4 kHz) FFT. This allowed for a simplified treatment of the crosstalk cancelation.

For this case, 4 kHz crosstalk into 8 kHz receiver, no such constraint on the FFT alignment is needed. The N input samples into the 8 kHz FFT can be taken freely from any starting point within the N+CE8 samples of the 8 kHz DMT symbol. For any chosen alignment, the crosstalk samples will belong to a single 4 kHz DMT symbol. In FIG. 3 the offset of the N input samples relative to the start of the 8 kHz DMT symbol is denoted by delta. The constellation points that are modulated on the tones of the 4 kHz symbols a $X_k$, with k=0, ..., 2N-1, with:

$$X_{2N-k} = X^*_k \tag{1}$$

$$X_0 = 0 = X_N$$

The 2N samples of the body of the 4 kHz symbol are then given by:

$$x_n = \sum_{k=0}^{2N-1} X_{k'} e^{j\frac{2\pi k' n}{2N}} \tag{2}$$

Using (1), this can be rewritten as:

$$x_n = \sum_{k'=0}^{N-1} X_{k'} e^{j\frac{2\pi k' n}{2N}} + \sum_{k'=N}^{2N-1} X_{k'} e^{j\frac{2\pi k' n}{2N}} \tag{3}$$

$$= \sum_{k'=0}^{N-1} X_{k'} e^{j\frac{2\pi k' n}{2N}} + \sum_{k'=1}^{N} X_{2N-k'} e^{j\frac{2\pi(2N-k')n}{2N}}$$

$$= \sum_{k'=0}^{N-1} X_{k'} e^{j\frac{2\pi k' n}{2N}} + \sum_{k'=0}^{N-1} X^*_{k'} e^{-j\frac{2\pi k' n}{2N}}$$

Since each 4 kHz symbol affects two 8 kHz symbols, we'll look separately at the "first" and "second" 8 kHz symbol that overlaps with the 4 kHz symbol For a specific alignment as shown in the samples of the 4 kHz symbol that contribute to FFT input of the first 8 kHz symbol are given by:

$$s_n^{(1)} = [x_{2N-CE4+\Delta} \; x_{2N-CE4+\Delta+1} \ldots x_{2N-1} \; x_0 \; x_1 \ldots x_{N-1-CE4+\Delta}] \tag{4}$$

Likewise, the samples of the 4 kHz symbol that contribute to FFT input of the second 8 kHz symbol are given by:

$$s_n^{(2)} = [x_{N-CE8+\Delta} \; x_{N-CE8+\Delta+1} \ldots x_{2N-1-CE8+\Delta}] \tag{5}$$

Frequency Domain Representation of the Crosstalk

The intention is to cancel the crosstalk coming from the 4 kHz symbol into the 8 kHz symbols in the frequency domain. For this purpose, consider the N "crosstalk samples" given by either (4) or (5) as samples coming from an equivalent 8 kHz symbol. Thus a set of constellation points such that the N-point IFFT of these constellation points generates the same sample values as (4) and (5) is required. A calculation of the frequency representation of this equivalent 8 kHz symbol and express it in terms of the constellation points $X_k$ of the 4 kHz symbol is required. Finding the frequency representation of the samples $s_n^{(1)}$ can be done by simply taking the FFT of (4):

$$FFT_k(s^{(1)}) = \sum_{n=0}^{N-1} s_n^{(1)} e^{-j\frac{2\pi k n}{N}} \tag{6}$$

-continued $$= \sum_{n=0}^{N-1} x_{n-CE4+\Delta} e^{-j\frac{2\pi k n}{N}}$$

$$= \sum_{n=0}^{N-1} \left( \sum_{k'=0}^{N-1} X_{k'} e^{j\frac{2\pi k'(n-CE4+\Delta)}{2N}} + \sum_{k'=0}^{N-1} X^*_{k'} e^{-j\frac{2\pi k'(n-CE4+\Delta)}{2N}} \right) e^{-j\frac{2\pi k n}{N}}$$

Inverting the order of the sums over n and k', we get:

$$FFT_k(s^{(1)}) = \sum_{k'=0}^{N-1} X_{k'} e^{-j\frac{2\pi k'(CE4-\Delta)}{2N}} \sum_{n=0}^{N-1} e^{j\frac{2\pi(k'-2k)n}{2N}} + \tag{7}$$

$$\sum_{k'=0}^{N-1} X^*_{k'} e^{j\frac{2\pi k'(CE4-\Delta)}{2N}} \sum_{n=0}^{N-1} e^{-j\frac{2\pi(k'+2k)n}{2N}}$$

Separating out the even and odd terms in the sum over k', we get:

$$FFT_k(s^{(1)}) = \sum_{k'=0}^{N/2-1} X_{2k'} e^{-j\frac{2\pi k'(CE4-\Delta)}{N}} \sum_{n=0}^{N-1} e^{j\frac{2\pi(k'-k)n}{N}} + \tag{8}$$

$$e^{-j\frac{2\pi(CE4-\Delta)}{2N}} \sum_{k'=0}^{N/2-1} X_{2k'+1} e^{-j\frac{2\pi k'(CE4-\Delta)}{N}} \sum_{n=0}^{N-1} e^{j\frac{2\pi(2k'-2k+1)n}{N}} +$$

$$\sum_{k'=0}^{N/2-1} X^*_{2k'} e^{j\frac{2\pi k'(CE4-\Delta)}{N}} \sum_{n=0}^{N-1} e^{-j\frac{2\pi(k'+k)n}{N}} +$$

$$e^{j\frac{2\pi(CE4-\Delta)}{2N}} \sum_{k'=0}^{N/2-1} X^*_{2k'+1} e^{j\frac{2\pi k'(CE4-\Delta)}{N}} \sum_{n=0}^{N-1} e^{-j\frac{2\pi(2k'+2k+1)n}{N}}$$

This can be further simplified by using the following identities:

$$\sum_{n=0}^{N-1} e^{j\frac{2\pi(k'-k)n}{N}} = N\delta_{kk'} \tag{9}$$

$$\sum_{n=0}^{N-1} e^{j\frac{2\pi(k'+k)n}{N}} = N\delta_{k0}\delta_{k'0}$$

$$\sum_{n=0}^{N-1} e^{j\frac{2\pi(2k'-2k+1)n}{N}} = \frac{2}{1 - e^{j\frac{2\pi(k'-2k+1)}{2N}}}$$

$$\sum_{n=0}^{N-1} e^{j\frac{2\pi(2k'+2k+1)n}{N}} = \frac{2}{1 - e^{j\frac{2\pi(2k'+2k+1)}{2N}}}$$

Using (9) in (8), we get:

$$FFT_k(s^{(1)}) = N \cdot X_{2k} e^{-j\frac{2\pi k'(CE4-\Delta)}{N}} + \tag{10}$$

-continued $$2 \cdot e^{-j\frac{2\pi(CE4-\Delta)}{2N}} \sum_{k'=0}^{N/2-1} X_{2k'+1} \frac{e^{-j\frac{2\pi k'(CE4-\Delta)}{N}}}{1 - e^{j\frac{2\pi(2k'-2k+1)}{2N}}} +$$

$$N \cdot X_0 + 2 \cdot e^{j\frac{2\pi(CE4-\Delta)}{2N}} \sum_{k'=0}^{N/2-1} X_{2k'+1}^* \frac{e^{j\frac{2\pi k'(CE4-\Delta)}{N}}}{1 - e^{j\frac{2\pi(2k'+2k+1)}{2N}}}$$

The third term in (10) can be dropped if we assume that no energy is sent at DC (which is typically the case). Also, the contribution of the fourth term is very small compared to the other remaining terms. This means that for practical purposes, (10) reduces to:

$$FFT_k(s^{(1)}) = \qquad (11)$$

$$N \cdot X_{2k} e^{-j\frac{2\pi k(CE4-\Delta)}{N}} + 2 \cdot e^{-j\frac{2\pi(CE4-\Delta)}{2N}} \sum_{k'=0}^{N/2-1} X_{2k'+1} \frac{e^{-j\frac{2\pi k'(CE4-\Delta)}{N}}}{1 - e^{j\frac{2\pi(2k'-2k+1)}{2N}}}$$

Formula (11) gives us the frequency representation of the N samples (4). It's straightforward to see that the IFFT of these frequency-domain points will results in the N samples (4), since the expression (11) is just the FFT of those samples. Note that the frequency domain representation depends only on the constellation points of the 4 kHz crosstalk symbol and the alignment of the FFT input samples relative to the symbol boundaries.

The frequency representation of the samples $s_n^{(2)}$ (see (5)) is done in much the same way. After a similar calculation, we find:

$$FFT_k(s^{(2)}) = \qquad (12)$$

$$N \cdot X_{2k} e^{j\frac{2\pi k(\Delta-CE8)}{N}} - 2 \cdot e^{j\frac{2\pi(\Delta-CE8)}{2N}} \sum_{k'=0}^{N/2-1} X_{2k'+1} \frac{e^{j\frac{2\pi k'(\Delta-CE8)}{N}}}{1 - e^{j\frac{2\pi(2k'-2k+1)}{2N}}}$$

Precoding Coefficients

Precoding is done differently for "even-numbered" and "odd-numbered" 8 kHz DMT symbols. As can be seen form (11) and (12), the 4 kHz crosstalk symbol will affect the first 8 kHz symbol that overlaps with the 4 kHz symbol differently than the second 8 kHz symbol that overlaps with the same 4 kHz symbol. The constellation point modulated on tone k of the 8 kHz symbol (i.e. the tone with frequency k*8.625 kHz) is denoted as $A_k$, k=0, . . . , N/2-1. For the even-numbered symbols, we use the result (11). This leads to the following precoding:

$$A_k \to A_k - \frac{H_{mn}(k)}{H_{mm}(k)} \left( N \cdot X_{2k} e^{-j\frac{2\pi k(CE4-\Delta)}{N}} + 2 \cdot e^{-j\frac{2\pi(CE4-\Delta)}{2N}} \sum_{k'=0}^{N/2-1} X_{2k'+1} \frac{e^{-j\frac{2\pi k'(CE4-\Delta)}{N}}}{1 - e^{j\frac{2\pi(2k'-2k+1)}{2N}}} \right) \qquad (13)$$

For the odd-numbered symbols, we use the result (12). This leads to the following preceding:

$$A_k \to A_k - \frac{H_{mn}(k)}{H_{mm}(k)} \left( N \cdot X_{2k} e^{j\frac{2\pi k(\Delta-CE8)}{N}} - 2 \cdot e^{j\frac{2\pi(\Delta-CE8)}{2N}} \sum_{k'=0}^{N/2-1} X_{2k'+1} \frac{e^{j\frac{2\pi k'(\Delta-CE8)}{N}}}{1 - e^{j\frac{2\pi(2k'-2k+1)}{2N}}} \right) \qquad (14)$$

The crosstalk affecting tone k of an 8 kHz symbol has contributions from a single even tone of the 4 kHz symbol (the tone that coincides with the frequency of the 8 kHz tone), as well as contributions from all odd (4 kHz) tones. Similarly to the case of 8 kHz crosstalk into 4 kHz symbol, the contributions of the odd tones are not evenly weighted.

Simulations

Both the crosstalker (the 4 kHz system) and the victim system (the 8 kHz system) are connected to 26 awg-gauge loops of 50 meter length. To model the frequency response of the crosstalk channel, a 99% worst-case FEXT coupling was used, further assuming that the phase behavior of the crosstalk channel was identical to the phase behavior of the direct channel. For the purposes of the simulation, tones 50 to 1000 (on the 8 kHz grid) were used for transmission. The crosstalk canceller only works on these tones. Transmission is modeled as 4 QAM on all active subcarriers. During the simulation, DMT symbols are generated for both a 4 kHz symbol rate and an 8 kHz symbol rate. The samples corresponding to the 8 kHz symbol are sent through the direct channel by performing convolution with the impulse response of the direct channel. The samples corresponding to the 4 kHz symbol are sent through the crosstalk channel by performing convolution with the impulse response of the crosstalk channel. The resulting output samples of the direct channel and the crosstalk channel are added to make up the total receive signal consisting of useful signal and crosstalk. Note that the DMT symbols for the different symbol rates are aligned as shown in FIG. 3 The receiver performs the symbol alignment and calculates the SNR.

Simulation Results

The results of the crosstalk canceling obviously depend on the number of terms that is included in the preceding (see formulas (13) and (14)). To achieve the maximum gain, up to N/2 terms should be included in the preceding of a single tone. This is not a practical solution in implementation, but it establishes the upper bound of what can be achieved. The results depend strongly on the number of terms in the precoding structure. Note also that in this case, there is no difference between odd and even tones. The implementation with minimum complexity is obtained when only the first term in (13) or (14) is used in the preceding (denoted as "no odd tones" in This ignores the contributions of all odd 4 kHz tones to the crosstalk on the 8 kHz tones. This implementation has the same complexity as the precoder for a set of systems that all use the same tone spacing. However, the performance improvement that can be realized in this case is very limited. The performance goes up gradually as more terms are added to the precoding. Crosstalk canceling is possible, but requires a multi-tap preceding per tone. Each of the 8 kHz tones receives a crosstalk contribution from all 4 kHz tones, not just the tone with the same frequency. Because the crosstalk contribution of each of the 4 kHz tones decreases rapidly, it is feasible to limit the number of terms in the precoding. This allows for various performance vs. complexity trade-offs.

Figure 8B:
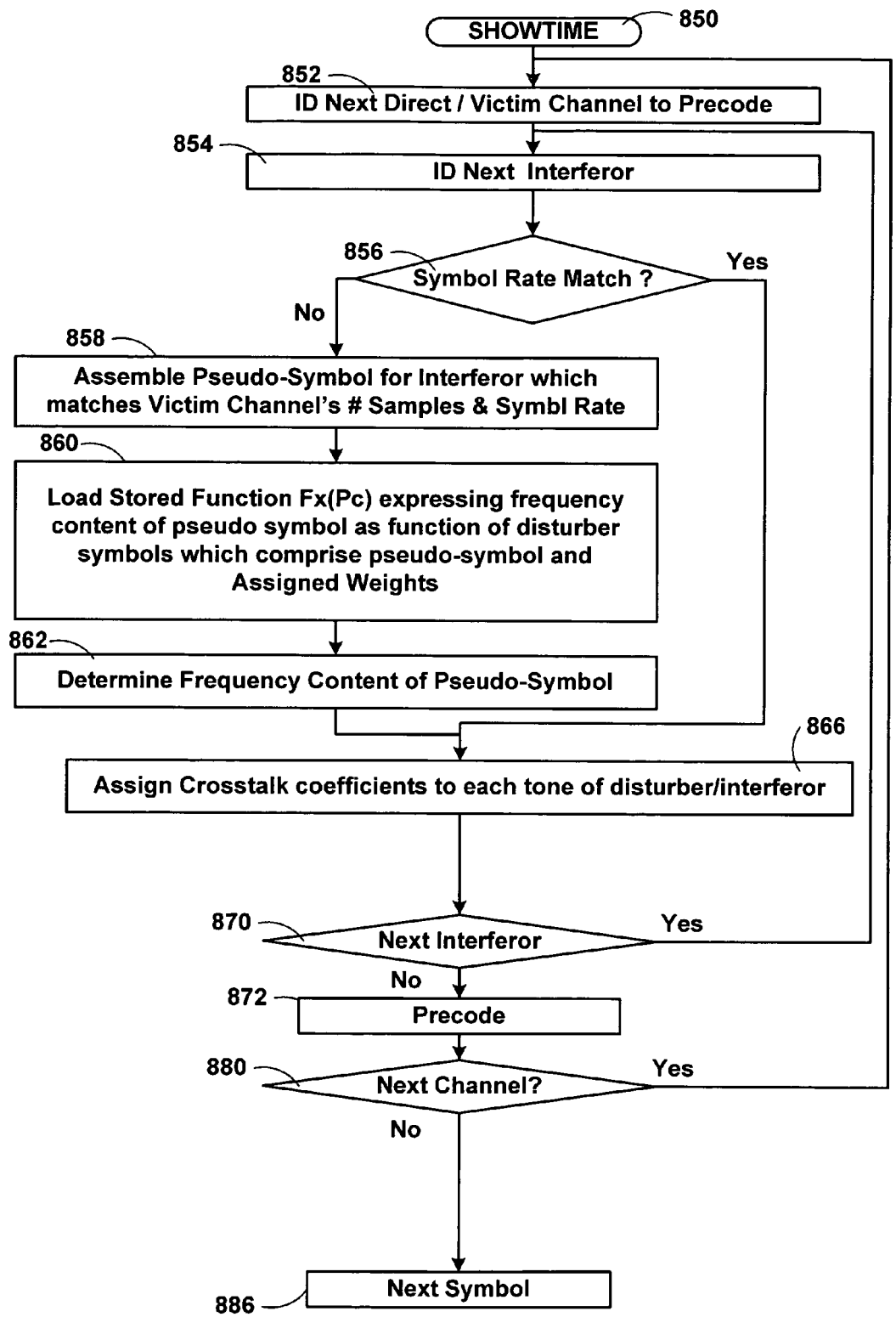

FIGS. 8A-8B are process flow diagrams for preceding bundled subscriber lines during both training and showtime phases of operation respectively.

FIG. 8A shows training initiated in process 800 in which a new line(s) is initialized. Next in process 802-804 the id of the next interferor/disturber and the next direct/victim channel is determined respectively. Then in decision process 806 a determination is made as to whether the associated symbol rates for victim and interferor channels match. If they do then control passes to process 816 in which crosstalk coefficients are assigned to the tones of the interferer. The higher the coefficient, the greater the crosstalk coupling factor. Alternately, if symbol rates do not match control passes to processes 808-812. In process 808 a pseudo-symbol is assembled from the interferer channel. The pseudo-symbol matches the victim channel's sample number and symbol rate. Next in process 810 a closed form function or expression is generated which expresses frequency content of the pseudo symbol as a function of disturber/interferor symbols which comprise the pseudo-symbol. Next in process 812 the frequency content of the pseudo symbol is determined based on the actual complex values of the contributing tones from the disturber channel and the weighting factors attached thereto as shown in FIG. 6. Then in process 816 crosstalk coefficients are assigned to the tones of the pseudo-symbol. The transmitted victim channel is precoded in process 820 to reduce crosstalk from the interferor/disturber channel. Precoding typically includes contributions from more than one interferor channel but can be handled one interferer at a time, depending on the training protocol. Next, slicer error indicia is received from the remote modem receiving the precoded victim channel. If slicer error is below an acceptable threshold then in decision process 824 cross-talk has been reduced to an acceptable level after which control passes to process 826. In process 826 all accumulated crosstalk cancellation information, functions, coefficients and weighting factors for the selected victim and disturber(s) channels is stored. Then in decision processes 828 and 830 further processing of the next victim channel or next interferor for the current victim channel is initiated. Next in process 832 a determination may be made as to the major interferors for each victim channel and limited processing resources may be apportioned accordingly. If such a determination is made, then in process 834 precode taps settings for each direct/victim channel are stored for the top interferors established in process 832. Finally, in decision process 836, a determination is made as to whether training is complete of if a new channel needs initialization. If there is a new channel requiring training then control returns to process 800.

FIG. 8B shows the processes associated with showtime operation of the bundled subscriber lines, and specifically preceding thereof. Showtime is initiated in process 850. In processes 852-854 the id of the next direct/victim channel and the first/next interferor/disturber channel is determined respectively. Then in decision process 856 a determination is made as to whether the associated symbol rates for victim and interferer channels match. If they do then control passes to process 866 in which crosstalk coefficients are assigned to the tones of the interferor. Alternately, if symbol rates do not match control passes to processes 858-862. In process 858 a pseudo-symbol is assembled from the interferer channel. The pseudo-symbol matches the victim channel's sample number and symbol rate. Next in process 860 the closed form function or expression established during the training phase is loaded along with the assigned pseudo-channel weights discussed above. Next in process 862 the frequency content of the pseudo symbol is determined based on the actual complex values of the contributing tones from the disturber channel and the weighting factors attached thereto as shown in FIG. 6. Then in process 866 crosstalk coefficients determined in the training phase are assigned to the tones of the pseudo-symbol. Next in decision process 870 a determination is made as to whether any further interferors for the subject channel remain. If there are then control returns to process 854 for further precode processing of the aggregate precode factor to be applied to the subject victim/direct channel. If precode calculation for all interferors is complete, then control passes to process 872 in which precoding of the direct/victim channel is completed. Next in decision process 880 a determination is made as to whether all victim/channels have been processed in the current symbol interval. If not control returns to process 852. If processing of all channels is complete, then control passes to process 886 for the showtime processing of all channels in the next symbol interval.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for precoding multi-tone modulated transmissions of a plurality of communication channels over bundled subscriber lines, and the apparatus comprising:
   a pseudo symbol controller configured to detect a victim communication channel and an interferor communication channel having non-matching symbol rates, and to transform the interferor channel into a pseudo-symbol having both a substantially similar length as a corresponding symbol of the victim channel together with defined tonal characteristics expressed in terms of the interferer channel; and
   a precoder assigning crosstalk coefficients to selected sub-channels or tones of the pseudo symbol and precoding the victim channel with the pseudo symbol using the crosstalk coefficients;
   thereby generating a precoded victim symbol which exhibits reduced crosstalk between the selected victim and interferer.

2. The apparatus of claim 1, further comprising:
   the pseudo symbol controller further configured to express a frequency content of the pseudo-symbol as a function of the interferer channel symbols which comprise the pseudo-symbol and to determine a frequency content of the pseudo-symbol based on actual complex coefficients associated with each sub-channel or tone of the corresponding interferor channel symbols.

3. The apparatus of claim 1, wherein the victim channel exhibits a 4 kHz symbol rate and the interferer channel exhibits an 8 kHz symbol rate.

4. The apparatus of claim 1, wherein the victim channel exhibits an 8 kHz symbol rate and the interferer channel exhibits a 4 kHz symbol rate.

5. The apparatus of claim 1, further comprising:
   the pseudo symbol controller further configured to align pseudo-symbol boundaries with symbol boundaries in the interferor channel.

6. A method for precoding multi-tone modulated transmissions over bundled subscriber lines, comprising:
   detecting a victim channel and an interferer channel having non-matching symbol rates and non-matching numbers of samples;
   transforming the interferor channel into a pseudo-symbol having both a substantially similar length as a corresponding symbol of the victim channel together with defined tonal characteristics expressed in terms of the interferor channel;

assigning crosstalk coefficients to selected sub-channels or tones of the pseudo symbol; and precoding the victim channel with the pseudo symbol using the crosstalk coefficients assigned in the assigning act; thereby generating a precoded victim symbol which exhibits reduced crosstalk between the selected victim and interferor.

7. The method of claim 6, wherein the transforming act further comprises:

assembling a pseudo-symbol for the interferer channel, and the pseudo-symbol having a substantially similar number of samples and symbol rate as the victim channel;

expressing a frequency content of the pseudo-symbol as a function of the interferor channel symbols which comprise the pseudo-symbol; and determining a frequency content of the pseudo-symbol based on actual complex coefficients associated with each sub-channel or tone of the corresponding interferer channel symbols and the function expressed in the expressing act.

8. The method of claim 6 wherein the victim channel exhibits a 4 kHz symbol rate and the interferer channel exhibits an 8 kHz symbol rate.

9. The method of claim 6 wherein the victim channel exhibits an 8 kHz symbol rate and the interferor channel exhibits a 4 kHz symbol rate.

10. The method of claim 6 wherein the transforming act further comprises:

aligning a pseudo-symbol boundaries with symbols in the interferer channel.

11. The method of claim 6 further comprising the act subsequent to the precoding act of:

transforming the precoded victim symbol between a time domain and a frequency domain over an integration interval common to both victim and disturber channels.

12. The method of claim 6, wherein the bundled subscriber lines couple a selected one of:

a multiple-input multiple-output (MIMO) communication system and a vectored communication system.

13. A means for precoding multi-tone modulated transmissions over bundled subscriber lines, comprising:

means for detecting a victim channel and an interferor channel having non-matching symbol rates and non-matching numbers of samples;

means for transforming the interferor channel into a pseudo-symbol having both a substantially similar length as a corresponding symbol of the victim channel together with defined tonal characteristics expressed in terms of the interferor channel;

means for assigning crosstalk coefficients to selected sub-channels or tones of the pseudo symbol; and means for precoding the victim channel with the pseudo symbol using the crosstalk coefficients assigned in the assigning act; thereby generating a precoded victim symbol which exhibits reduced crosstalk between the selected victim and interferor.

14. The means for precoding of claim 13, wherein the transforming means further comprises:

means for assembling a pseudo-symbol for the interferer channel, and the pseudo-symbol having a substantially similar number of samples and symbol rate as the victim channel;

means for expressing a frequency content of the pseudo-symbol as a function of the interferor channel symbols which comprise the pseudo-symbol; and means for determining a frequency content of the pseudo-symbol based on actual complex coefficients associated with each sub-channel or tone of the corresponding interferor channel symbols and the function expressed in the means for expressing.

15. The means for preceding of claim 13 wherein the victim channel exhibits a 4 kHz symbol rate and the interferor channel exhibits an 8 kHz symbol rate.

16. The means for preceding of claim 13 wherein the victim channel exhibits an 8 kHz symbol rate and the interferor channel exhibits a 4 kHz symbol rate.

17. The means for preceding of claim 13 wherein the transforming means further comprises:

means for aligning a pseudo-symbol boundaries with symbols in the interferor channel.

18. The means of claim 13 further comprising: means for transforming the precoded victim symbol between a time domain and a frequency domain over an integration interval common to both victim and disturber channels.

19. The means of claim 13, wherein the bundled subscriber lines couple a selected one of: a multiple-input multiple-output (MIMO) communication system and a vectored communication system.

* * * * *

UNITED STATES PATENT AND TRADEMARK OFFICE
CERTIFICATE OF CORRECTION

PATENT NO. : 8,427,933 B2
APPLICATION NO. : 12/583694
DATED : April 23, 2013
INVENTOR(S) : Schelstraete et al.

Page 1 of 3

It is certified that error appears in the above-identified patent and that said Letters Patent is hereby corrected as shown below:

On the title page, in Item (57), under "ABSTRACT", in Column 2, Line 5, delete "interferer" and insert -- interferor --, therefor.

In the Drawings:

In Fig. 8A, Sheet 5 of 6, for Tag "808", in Line 2, delete "Symbl" and insert -- Symbol --, therefor.

In Fig. 8B, Sheet 6 of 6, for Tag "858", in Line 2, delete "Symbl" and insert -- Symbol --, therefor.

In the Specification:

In Column 2, Line 23, delete "preceding" and insert -- precoding --, therefor.

In Column 2, Lines 27-28, delete "interferer" and insert -- interferor --, therefor.

In Column 2, Line 29, delete "interferer" and insert -- interferor --, therefor.

In Column 2, Line 32, delete "interferer" and insert -- interferor --, therefor.

In Column 2, Line 52, delete "sites." and insert -- sites; --, therefor.

In Column 2, Line 54, delete "FIG. 1." and insert -- FIG. 1; --, therefor.

In Column 3, Line 4, delete "pseudo-symbols;" and insert -- pseudo-symbols; and --, therefor.

In Column 4, Line 25, delete "line 174" and insert -- line 174. --, therefor.

Signed and Sealed this
Twenty-ninth Day of October, 2013

Teresa Stanek Rea
*Deputy Director of the United States Patent and Trademark Office*

CERTIFICATE OF CORRECTION (continued)
U.S. Pat. No. 8,427,933 B2

In Column 5, Line 22, delete "lin2" and insert -- line 2 --, therefor.

In Column 7, Line 17, delete "symbol" and insert -- symbol. --, therefor.

In Column 7, Line 57, in Equation (2), delete " $FFT_{2N}[y_0 \ldots y_{N-CE8} \ldots z_{N-1}\ z_0 \ldots z_{N-CE8-1}]$ " and insert -- $FFT_{2N}\left[ y_0 \ldots y_{N-1}\ z_{N-CE8} \ldots z_{N-1}\ z_0 \ldots z_{N-CE8-1} \right]$ --, therefor.

In Column 9, Line 47, delete "channel" and insert -- channel. --, therefor.

In Column 10, Line 35, delete "symbols" and insert -- symbols. --, therefor.

In Column 11, Line 9, delete "FIG. 3the" and insert -- FIG. 3 the --, therefor.

In Column 12, Line 55, in Equation (9), delete " $\sum_{n=0}^{N-1} e^{j\frac{2\pi(2k'-2k+1)n}{N}} = \frac{2}{1 - e^{j\frac{2\pi(k'-2k+1)}{2N}}}$ "

and insert -- $\sum_{n=0}^{N-1} e^{j\frac{2\pi(2k'-2k+1)n}{N}} = \frac{2}{1 - e^{j\frac{2\pi(2k'-2k+1)}{2N}}}$ --, therefor.

In Column 14, Line 2, delete "preceding:" and insert -- precoding: --, therefor.

In Column 14, Line 45, delete "preceding" and insert -- precoding --, therefor.

In Column 14, Line 47, delete "preceding" and insert -- precoding --, therefor.

In Column 14, Line 54, delete "preceding" and insert -- precoding --, therefor.

In Column 14, Line 62, delete "preceding" and insert -- precoding --, therefor.

In Column 15, Line 1, delete "preceding" and insert -- precoding --, therefor.

In Column 15, Line 11, delete "interferer." and insert -- interferor. --, therefor.

In Column 15, Line 15, delete "interferer" and insert -- interferor --, therefor.

In Column 15, Line 29, delete "interferer" and insert -- interferor --, therefor.

In Column 15, Line 51, delete "preceding" and insert -- precoding --, therefor.

In Column 15, Line 56, delete "interferer" and insert -- interferor --, therefor.

In Column 15, Line 60, delete "interferer" and insert -- interferor --, therefor.

In the Claims

In Column 16, Line 35, in Claim 1, delete "interferer" and insert -- interferor --, therefor.

In Column 16, Line 42, in Claim 1, delete "interferer." and insert -- interferor. --, therefor.

In Column 16, Line 46, in Claim 2, delete "interferer" and insert -- interferor --, therefor.

In Column 16, Line 52, in Claim 3, delete "interferer" and insert -- interferor --, therefor.

In Column 16, Line 55, in Claim 4, delete "interferer" and insert -- interferor --, therefor.

In Column 16, Line 63, in Claim 6, delete "interferer" and insert -- interferor --, therefor.

In Column 17, Line 22, in Claim 7, delete "interferer" and insert -- interferor --, therefor.

In Column 17, Line 26, in Claim 8, delete "interferer" and insert -- interferor --, therefor.

In Column 17, Line 34, in Claim 10, delete "interferer" and insert -- interferor --, therefor.

In Column 18, Line 15, in Claim 14, delete "interferer" and insert -- interferor --, therefor.

In Column 18, Line 28, in Claim 15, delete "preceding" and insert -- precoding --, therefor.

In Column 18, Line 31, in Claim 16, delete "preceding" and insert -- precoding --, therefor.

In Column 18, Line 35, in Claim 17, delete "preceding" and insert -- precoding --, therefor.